United States Patent [19]
Bennett et al.

[11] Patent Number: 6,092,121
[45] Date of Patent: Jul. 18, 2000

[54] METHOD AND APPARATUS FOR ELECTRONICALLY INTEGRATING DATA CAPTURED IN HETEROGENEOUS INFORMATION SYSTEMS

[75] Inventors: William E. Bennett, Tucson, Ariz.; Richard F. Boehme, Carmel; Samuel Kallner, Bronx, both of N.Y.; Stephen E. Levy, Saskatoon, Canada; Paul M. Matchen, Pleasantville; Michael J. Ryan, Newburgh, both of N.Y.; Richard D. Thompson, Trumbull, Conn.

[73] Assignee: International Business Machines Corporation, Armonk, N.Y.

[21] Appl. No.: 08/993,232

[22] Filed: Dec. 18, 1997

[51] Int. Cl.[7] .............................. G06F 15/16; G06F 15/17
[52] U.S. Cl. ...................... 709/250; 709/220; 709/203; 709/226; 709/221
[58] Field of Search ..................................... 709/250, 203, 709/216, 26, 40, 221, 226; 380/24, 49

[56] References Cited

U.S. PATENT DOCUMENTS

| | | | |
|---|---|---|---|
| 5,889,863 | 3/1999 | Weber | 709/250 |
| 5,931,917 | 8/1999 | Nguyen et al. | 709/250 |

FOREIGN PATENT DOCUMENTS

| | | |
|---|---|---|
| 0822692 A2 | 2/1998 | European Pat. Off. . |
| 7-244645 | 9/1995 | Japan . |
| 9-505162 | 5/1997 | Japan . |
| 9-231086 | 9/1997 | Japan . |
| 9-319673 | 12/1997 | Japan . |
| 11-500248 | 1/1999 | Japan . |
| WO 95/12269 | 5/1995 | WIPO . |
| WO 97/18635 | 5/1997 | WIPO . |

OTHER PUBLICATIONS

W. Stallings, "Data and Computer Communications", MacMillan Publishing Company, 1994.

Rodriquez et al., "On–Line Payment Scheme Arrives", CommunicationsWeek, Feb. 26, 1996.

Kimura, A., Kajihara, K., & Iio, K., "Hiding of search engines using didtributed WWW servers," NTT Software Laboratories, 3–9–11, Midori–Cho Musashino–Shi, Tokyo 180, Japan, Jul. 31, 1997.

Nikkei Communications, vol. 1, No. 16, pp. 78–82, 1995.

*Primary Examiner*—Mark H. Rinehart
*Assistant Examiner*—Ivan C. Pierce, III
*Attorney, Agent, or Firm*—Whitham, Curtis & Whitham; Stephen C. Kaufman, Esq.

[57] ABSTRACT

Reliable and secure transmission of information over the Internet is provided in a financial transaction processing system. The system electronically integrates data captured in heterogeneous information systems and transmits that data reliably and securely over the Internet between multiple diverse servers. The system includes at least one local computer system which electronically captures information input by a user of the computer system. The local computer system can access one or more remote servers via the Internet for form a dynamically reconfigurable wide area network (WAN). The remote servers electronically transfer data to heterogeneous information systems translated into their natural communications protocol and data format.

15 Claims, 4 Drawing Sheets

METHOD AND APPARATUS FOR ELECTRONICALLY INTEGRATING DATA CAPTURED IN HETEROGENEOUS INFORMATION SYSTEMS

CROSS REFERENCE TO RELATED APPLICATIONS

The invention disclosed herein is related in subject matter to U.S. patent applications Ser. Nos. 08/741,459 filed Oct. 31, 1996, by W. E. Bennett for "A System for Electronically Developing and Processing a Legal Document" (IBM Docket YO996-168), and Ser. No. 08/558,065 filed Nov. 13, 1995, by C. Wiecha for "System for Ordering Items Over a Computer Network Using an Electronic Catalog" (IBM Docket YO995-153), both assigned to a common assignee herewith. The disclosures of the foregoing applications are incorporated herein by reference.

DESCRIPTION

BACKGROUND OF THE INVENTION

1. Field of the Invention

The present invention generally relates to the reliable and secure transmission of financial information over the Internet in a financial transaction processing system and, more particularly, to a system for electronically integrating data captured in heterogeneous information systems and transmitting that data reliably and securely over the Internet between multiple diverse servers and to a system for electronically transferring data to heterogeneous information systems, wherein the data is translated into the natural communications protocol and data format for the heterogeneous information systems.

2. Background Description

The Internet is a collection of networks that allows users at disparate, heterogeneous computer systems to communicate with each other across organizational and geographical boundaries. The Internet uses a packet switched protocol referred to as the Transmission Control Protocol/Internet Protocol (TCP/IP). Full Internet access usually includes five key features; electronic mail (e-mail), logging on to Internet-connected computers using Telnet, transferring files from Internet-connected computers using File Transfer Protocol (FTP), getting access to discussion groups, and using various information-research tools, especially the World Wide Web (WWW).

The Internet can be viewed as a Wide Area Network (WAN) capable of linking disparate computer terminals. In a dedicated WAN, connections are typically made by leased telephone lines or other dedicated communications links. Security and reliability are built in to such systems. However, the price paid for this infrastructure and its built in security and reliability is inflexibility and the expense of the infrastructure itself. This invention is directed to the use of the Internet as part of a dynamically configurable WAN providing reliable and secure communication among a plurality of disparate servers in a financial transaction processing system.

SUMMARY OF THE INVENTION

It is therefore an object of the present invention to provide reliable and secure transmission of financial information over the Internet in a transaction processing system.

It is another object of the invention to provide a system for electronically integrating data captured in heterogeneous information systems and transmitting that data reliably and securely over the Internet between multiple diverse servers.

It is a further object of the invention to electronically transfer financial data to heterogeneous information systems translated into their natural communications protocol and data format.

According to the invention, there is provided at least one local computer system which electronically captures information input by a user of the computer system. The local computer system is connectable to one or more remote computer systems via the Internet to form a dynamic reconfigurable Wide Area Network (WAN).

The local computer system, in response to a user input or event, generates a request which is handled by an Input/Output (I/O) Application Program Interface (API) to generate a data buffer. The data buffer may or may not be encrypted, depending on the transaction. The data buffer is forwarded to a work flow (WF) client API which creates a WF client object containing the data buffer (possibly encrypted). The WF client object is then sent to a store and forward transport mechanism where it is queued with other WF client objects for transmission to designated servers via the Internet. The store and forward mechanism determines the destination WF server from data contained in the WF client object. The destination WF server is a logical site. There may be multiple servers acting as peers at the site to which the store and forward mechanism has been tasked to communicate. The store and forward transport mechanism would request from a name server the location of a WF server at the desired site. If attempts to communicate with that WF server fail, the store and forward transport mechanism notifies the name server that the WF server in question is down and requests another WF server at that site. This process is repeated until either a WF server is found that is communicating properly, or no more WF servers exist at that site, at which point the WF client object is returned to the queue for a later attempt.

The remote computer system, receiving a WF client object, examines the object to determine if the complete object has been received and, if so, transmits an acknowledgment to the sending store and forward mechanism, which then deletes the WF client object. If the store and forward mechanism does not receive this acknowledgment, failure is assumed and the above stated retry mechanism is invoked. Once a complete WF client object has been received, it is stored as a WF server object and is input to a map server function which extracts the data buffer and, if encrypted, decrypts the buffer. The data buffer is interpreted to invoke an appropriate message handler at the remote computer system. Depending on the action taken by the message handler, the data buffer may be modified and used to generate WF client objects containing other data buffers for transmission to the local computer system or another computer system, at which time the new data buffer may or may not be encrypted. The potentially modified buffer associated with the WF server object is then returned to the map server function, where a determination is made on the disposition of the buffer, and whether another interested message handler should be invoked. This process is repeated until there are no more interested message handlers, at which time the WF server object is transferred to a WF server API which may take one of two actions: update or destroy. An update indicates a requirement that the data buffer, state identifier, or both be modified from that of the object originally held in the server queue. A destroy indicates that the object is no longer needed, so it is removed from the server queue altogether.

The map server function is an application used for processing transactions in a completely data-driven fashion. It is a generic transaction handler, using configuration data to determine how to process requests. The code is completely reusable, as there is no link between the code and the types of transactions be handled.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The preferred embodiment of the invention is described in the environment of a specific application in which the invention has been implemented. The environment of this implementation is a retail automobile dealership. A typical present day retail automobile dealership captures and processes data for the purpose of facilitating the sale of automobiles. This data may require the participation of a customer, a car dealership, one or more financial institutions (e.g., banks and credit unions), one or more dealer information systems, one or more information (i.e., credit) bureaus, one or more insurance institutions, and the state's Department of Motor Vehicles. The data is collected in diverse means and is stored in heterogenous repositories; some on mainframe or mini computers, some on personal computers, and some on paper. This leads to an unwieldly situation. There is no easy means for data stored in one system to be available to another system, making the process inefficient and disadvantageously slow.

Figure 1:
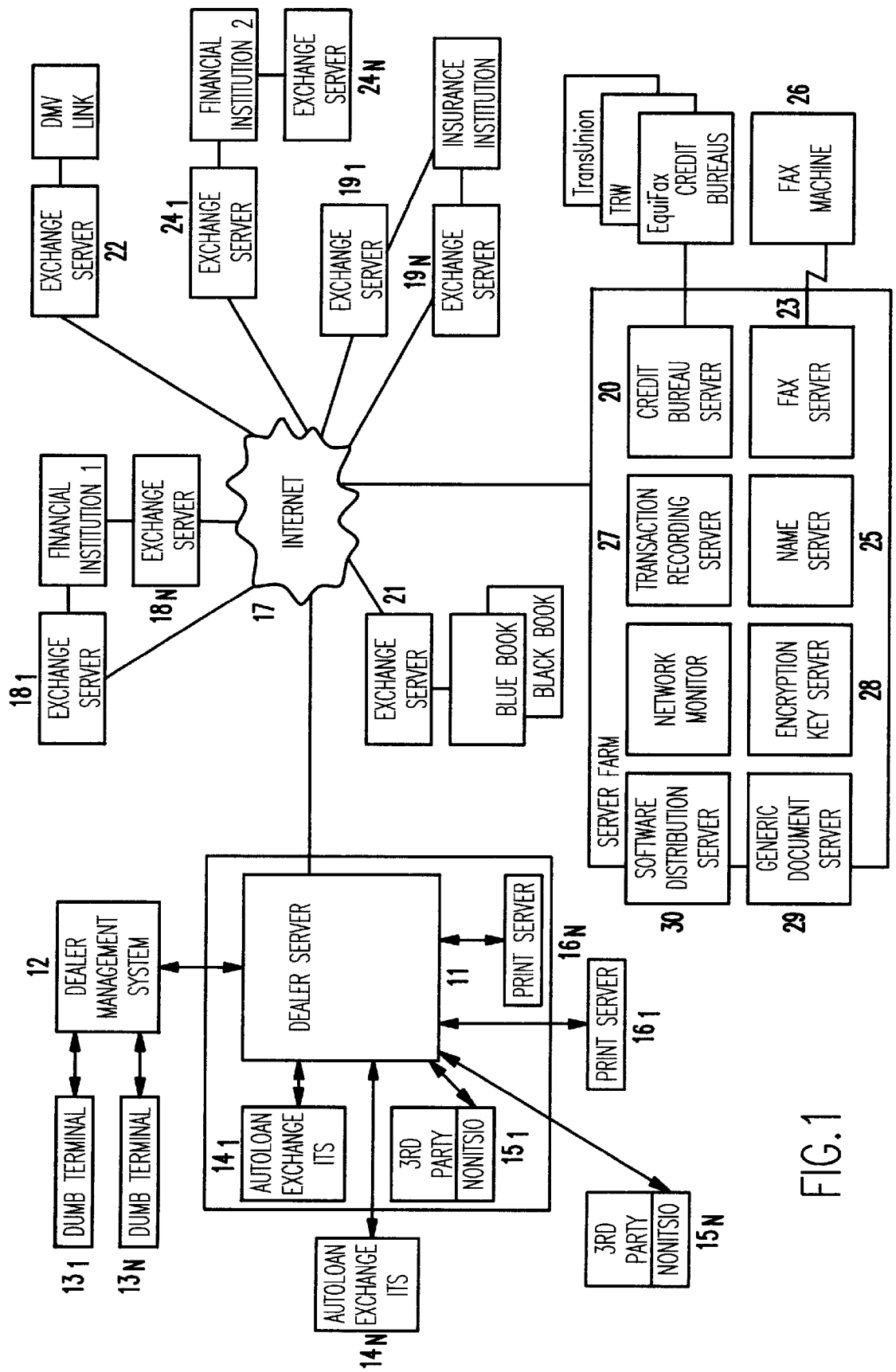
FIG. 1 is a block diagram illustrating the interconnection of disparate servers by the Internet in a dynamically reconfigurable WAN.

Referring now to the drawings, and more particularly to FIG. 1, there is shown in block diagram the system architecture of the dynamically reconfigurable WAN using the Internet applied to retail automobile sales. The dealer system 12 may be a mainframe or mini computer, such as International Business Machines (IBM) Corporation's ES9000 or AS400 series of computers, or a personal computer (PC) or a networked system of PCs, such as IBM's PS/2 series of personal computers, running an operating system such as IBM's OS/2 operating system, a hardwired or wireless Local Area Network (LAN), such as IBM's Token Ring network, or workstations, such as IBM's RS/6000 workstations, running and operating system, such as AIX (IBM's version of the UNIX operating system).

A dealer management system application program runs on the dealer management system 12 and provides the interface for a plurality of terminals $13_1$ to $13_n$ which may be either dumb terminals or personal computers, such as desktop and laptop computers, and are connected to the dealer management system 12 via a hardwired or wireless Local Area Network (LAN). The dealer management system 12 is a legacy system provided by some third party vendor.

The communication between the dealer server 11 and the dealer management system 12 is quite similar to the interface between, say, an exchange server and a financial institution's back-end automobile loan processing system. The dealer management system 12 allows inventory pulls, customer information pushes and pulls, and "deal" pushes and pulls. The dealer server 11 processes transactions in a completely data-driven fashion. The dealer server 11 implements a generic transaction handler, using configuration data to determine how to process requests. The preferred embodiment of dealer server 11 is an IBM PS/2 computer (or similar personal computer) running the OS/2 operating system.

In the specific application illustrated in FIG. 1, the dealer server 11 handles the registration of Auto Loan Exchange ITS client machines $14_1$ to $14_n$ and other third party machines $15_1$ to $15_n$ at the dealership. ITS is an acronym for Interactive Transaction Systems, and ITS client machines are clients in the current implementation of the invention. A Java version of the client has been developed via the exposed API interface, which would also allow any third party to develop an interface into the server. Java is a programming language developed by Sun Microsystems.

There are two classes of communication within the Auto Loan Excaange: Server/Server and Client/Server. The former refers to communication between the dealer server and any of its Internet connected servers, such as financial institution exchange servers or the facsimile server, and is discussed in more detail below. The latter refers to communication between the dealer server and any of the dealer clients, here represented by any member of sets 14 or 15. There is a permission list contained in the dealer server used to control communication with these clients by limiting what actions a user can perform. This list can be used, for example, to create various classes of users. A highly restricted data-entry class may be created for the creation of credit applications only. A person in this class would have the ability to create a credit application and pull a credit brueau report but would not be authorized to see the responses given from either the credit bureaus or financial institutions. A differently restricted salesperson class could be created allowing a member of that class to create, submit, and view the results of a credit application and credit bureau pull, but not to submit contracts or to view the credit applications of other salespersons. Then a managerial class could be created with permission to do and see everything, including managing users and their permissions in the system. This one small, representative example of the kind of control exercised at the dealer server over the dealer clients.

Attached to the dealer server 11 are one or more print servers $16_1$ to $16_n$, allowing the printing of all documents needed to purchase an automobile including, but not limited to, finance applications, finance contracts, life, accident and/or health insurance policies, and extended service/warranty agreements. Of importance in the illustration in FIG. 1 is the fact that the dealer server, the dealer client, and the print server can all be implemented on the same machine, which is how many current Auto Loan Exchange dealers are configured.

The dealer server 11 connects via the Internet 17 to various disparate servers. These connections are dynamic and configurable, depending on the specific transaction. That is, the connections may be made to various alternative servers selectable by the user or in an order of preference stored in the dealer server. For example, there are typically multiple financial institutions having multiple server sets, here represented by two such server sets $18_1$ to $18_n$ and $24_1$ to $24_n$.

Each participating bank, credit union or other such financial institution would have at least one server connectable via the Internet 17. The user of the system selects one of these sites or an order of site preference to which loan application data and, ultimately, a loan contract are transmitted.

Likewise, there are typically multiple financial institutions that have a relationship with the dealer but are not participating in the Auto Loan Exchange system. Contact with these institutions is accomplished via the facsimile server 23, sending a typewritten facsimile transmission to the lender, here represented by a single such facsimile machine 26.

Also, there are typically multiple insurance institution servers, here represented by a set of such servers $19_1$ to $19_n$. In addition to these, the dealer server can also access via the Internet various databases, such as a credit bureau server 20, providing access to commercial credit bureaus such as Equifax, TRW (Experian) and TransUnion, to obtain the credit rating of a potential buyer, so-called "black book" and "blue book" databases connected to server 21 to assess trade-in values, and the state's Department of Motor Vehicles server 22 to verify registration and insurance information. In each case, the exchange server for the particular institution or data base is operable to electronically transfer the data received to their connected information systems translated into their natural communications protocol and data format.

The dealer server also has access, via the Internet 17, to various other servers, some of which will not be described. Since the Internet is being used as a dynamically configurable WAN, some mechanism must be in place to track this dynamism. This need is filled by the name server 25, which contains the location of all servers currently active in the system. This data is passed to clients attempting to communicate with these servers. Since this Internet communication is secure, an encryption key server 28 is needed to handle key distribution of new and updated keys. The transaction recording server 27 tracks all transactions between dealers and their partners including, but not limited to, credit bureaus, exchange servers at financial and insurance institutions, and the facsimile server. The generic document server 29 is a repository for documents which are common to many financial institutions, insurance companies, or other parties to the transaction with documents that need to be printed. When a request to print a document is made, the print server will query the document server as to the latest version of the document in question. If the document at the print server is out of date, the document server will provide the new version. Similarly, the software running on the dealer server 11 may be periodically updated by a software distribution server 30, again via the Internet 17.

Figure 2:
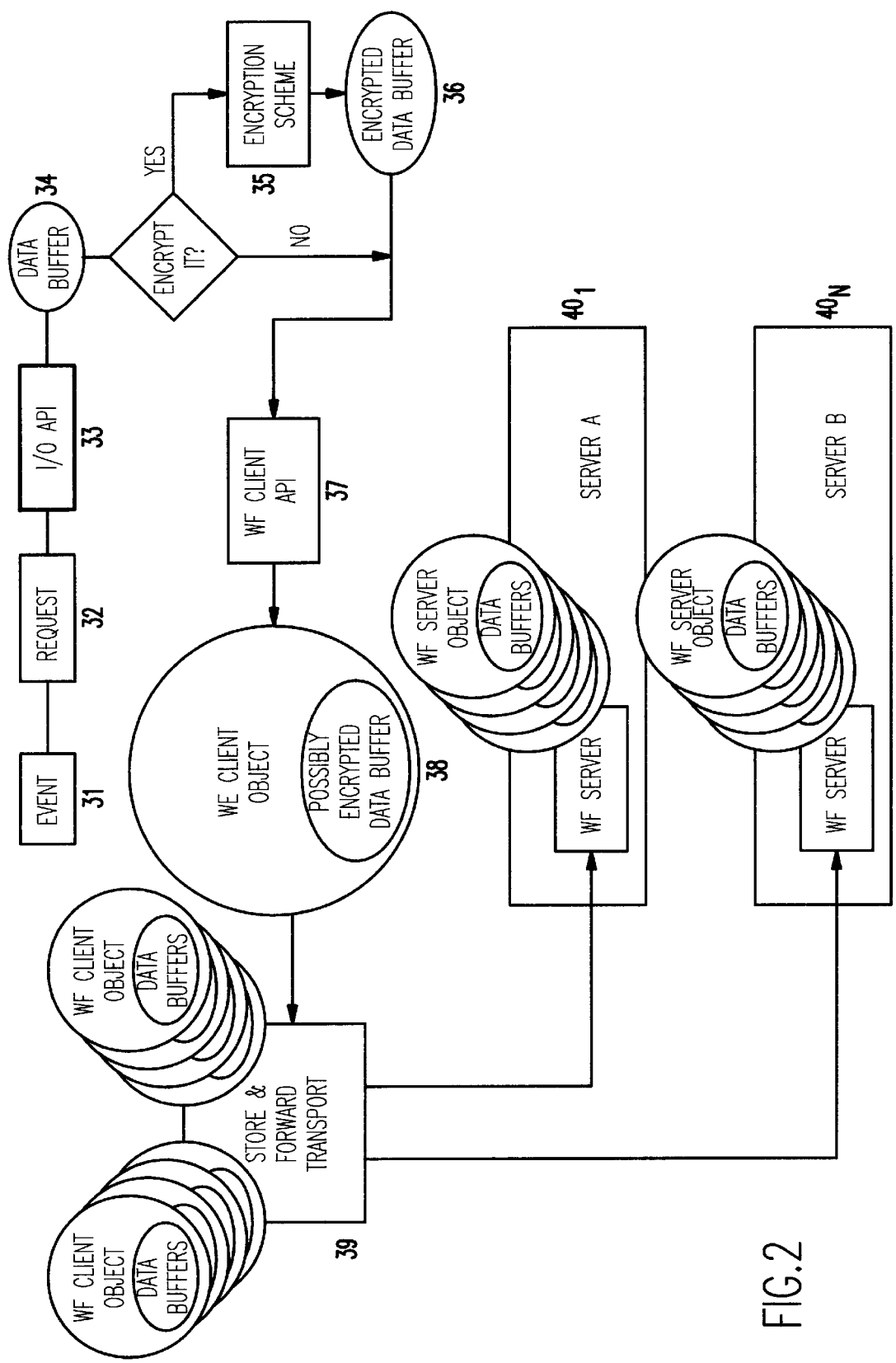
FIG. 2 is a block diagram showing the capture and data flow at a requesting server in the WAN of FIG. 1.

The local computer system, i.e., the dealer server 11, is shown in more detail in FIG. 2. In response to a user input or event 31, a request 32 is generated which is handled by an Input/Output (I/O) Application Program Interface (API) 33 to generate a data buffer, here implemented as a Non-ITS (Interactive Transaction Systems) Buffer (NIB) 34. ITS is an acronym for a tool for storing and representing data. The Non-ITS data buffers represent a machine independent data stream which is not of the ITS format. The NIB buffer may or may not be encrypted, depending on the transaction. If the NIB buffer is to be encrypted, it is sent to encryption function 35 to generate an encrypted NIB buffer 36. The NIB buffer (either encrypted or not) is forwarded to a work flow (WF) client API 37 which creates a WF client object 38 containing the NIB buffer (possibly encrypted). The WF client object 38 is then sent to a store and forward transport mechanism 39 where it is queued with other WF client objects for transmission to designated servers via the Internet. The store and forward mechanism 39 determines the destination WF server, which is a logical site, from data contained in the WF client object. There may be multiple servers acting as peers at the site to which the store and forward mechanism has been tasked to communicate. The store and forward transport mechanism would request from the name server 25 (FIG. 1) the location of a WF server at the desired site. If attempts to communicate with that WF server fail, the store and forward transport mechanism notifies the name server 25 that the WF server in question is down, and requests another WF server at that site. This process is repeated until either a WF server is found that is communicating properly, or no more WF servers exist at that site, at which point the WF client object is returned to the queue for a later attempt.

In FIG. 2, the servers $40_1$ to $40_n$ represent servers to whom the store and forward mechanism 39 needs to send objects via the Internet. As indicated in FIG. 1, there may be multiple destination server sets A, multiple server sets B, etc. at the various logical sites. Each server in these server sets would typically be a peer connected to the same back-end system. When a response is sent from the back-end system to server set A, it is not required or important that the response come to the same member of the server set from which the transaction was initiated.

Figure 3:
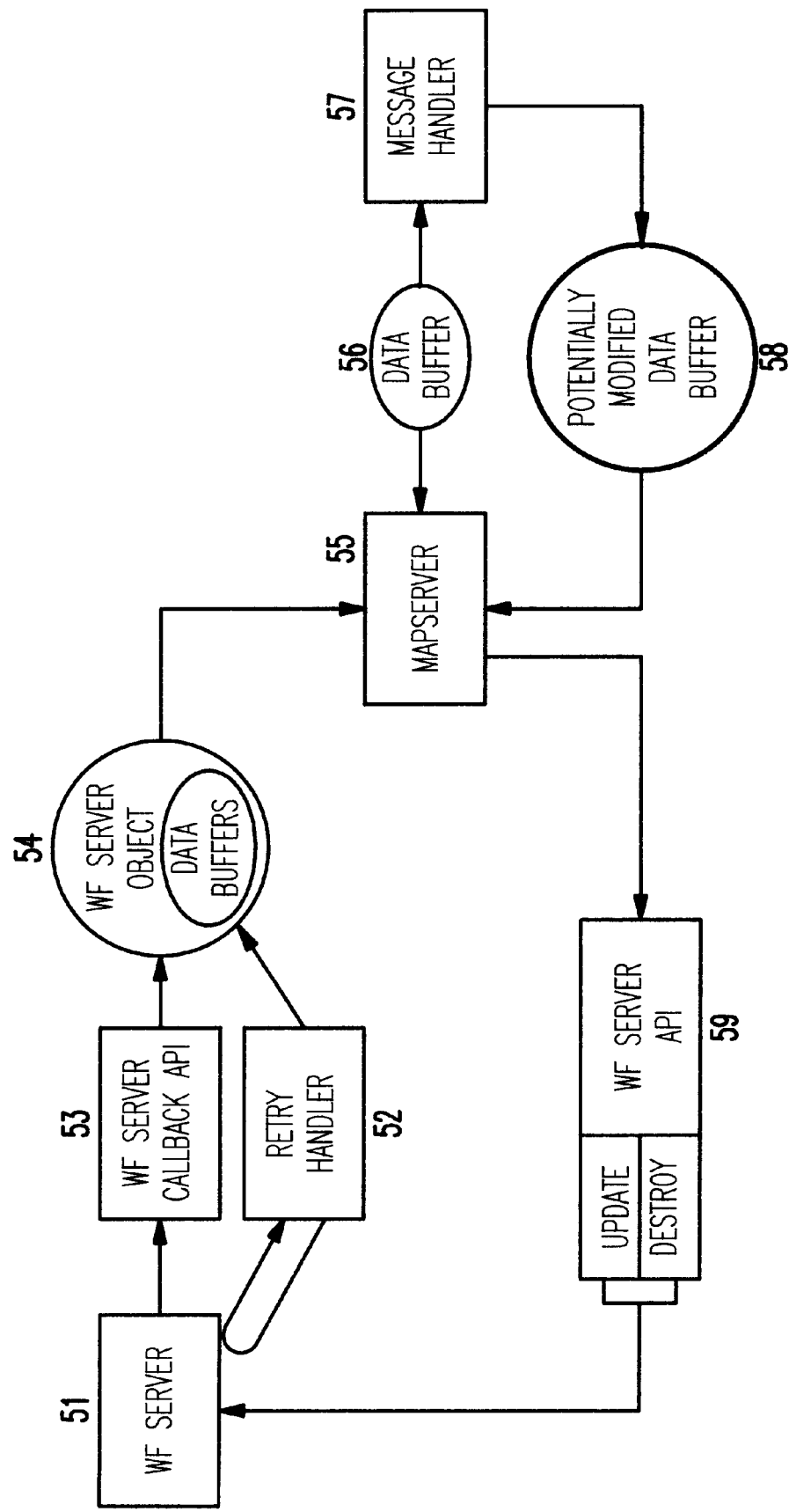
FIG. 3 is a block diagram showing the processing of data at a receiving server in the WAN of FIG. 1.

A server for a remote computer system is shown in FIG. 3 and may be, for example, a financial institution server 51. Upon receiving WF client object, the server 51 examines the object to determine if the complete object has been received and, if not, the incomplete object is destroyed, knowing that the store and forward mechanism (FIG. 2) will re-send the object. Once a complete WF client object has been received, the WF server callback API 53 is invoked to transmit an acknowledgment to the sending store and forward mechanism, which then deletes the WF client object. The received WF client object is converted to a WF server object 54 and input to a map server function 55 which extracts the NIB buffer 56 and, if encrypted, decrypts the buffer.

The NIB buffer 56 is interpreted to invoke an appropriate message handler 57 at the remote computer system. Depending on the action taken by the message handler 57, the NIB buffer may be modified at 58 and used to generate WF client objects containing other NIB buffers for transmission to the local computer system or another computer system, at which time the new NIB buffer may or may not be encrypted. The potentially modified NIB buffer associated with the WF server object is then returned to the map server function 55, where a determination is made on the disposition of the NIB buffer, and whether another interested message handler should be invoked. This process is repeated until there are no more interested message handlers, at which time the WF server object is transferred to a WF server API 59 which may take one of two actions: update or destroy. An update indicates a requirement that the NIB buffer, state identifier, or both be modified from that of the object originally held in the server queue. A destroy indicates that the object is no longer needed, so it is removed from the server queue altogether.

The map server function 55 is an application used for processing transactions in a completely data-driven fashion. It is a generic transaction handler, using configuration data to determine how to process requests. The code is completely reusable, as there is no link between the code and the types of transactions be handled.

Figure 4:
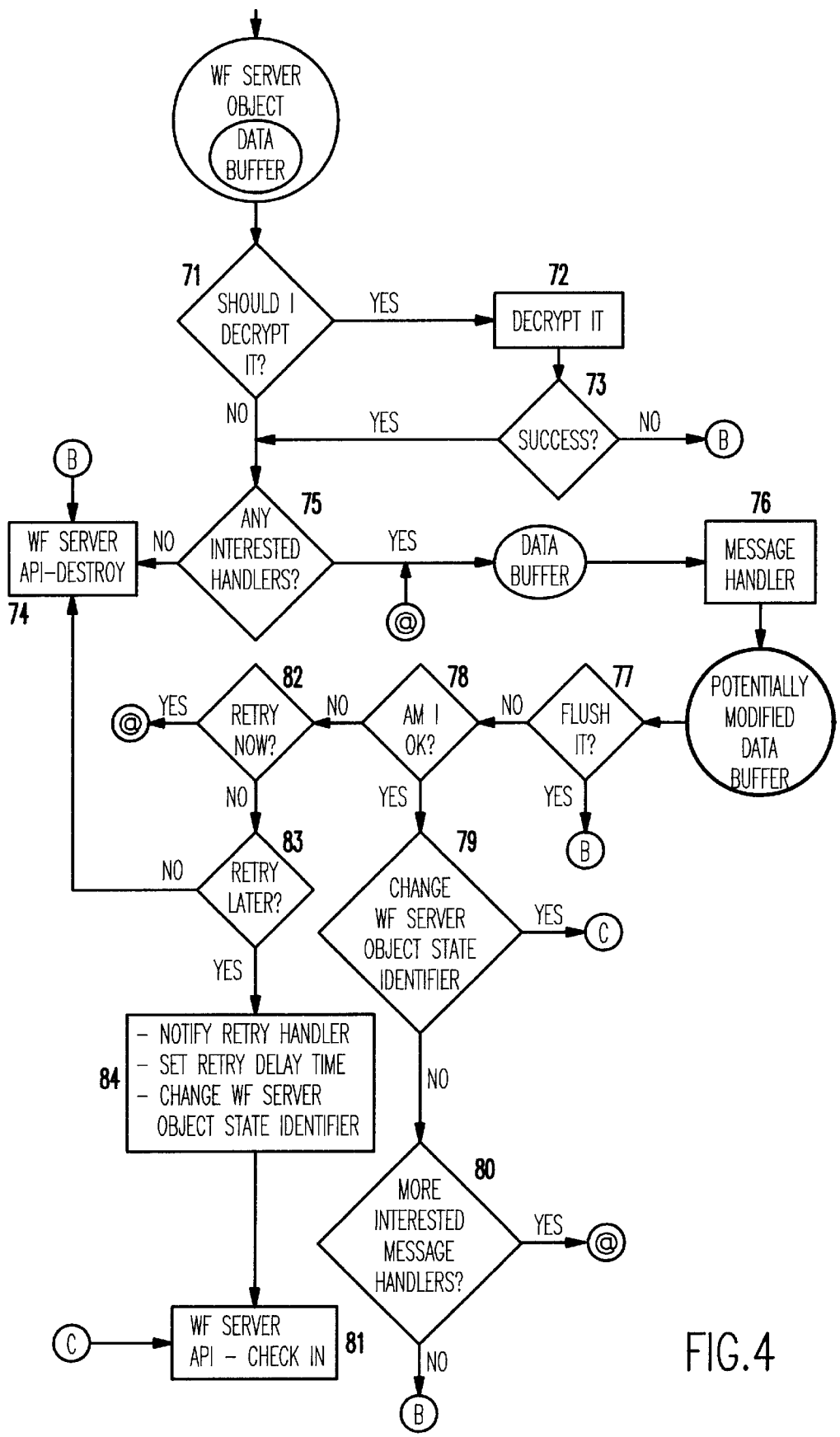
FIG. 4 is a flow diagram illustrating the logic of the map server function software implemented at the receiving server shown in FIG. 3.

The flow diagram for the map server function is shown in FIG. 4. The extracted NIB buffer is first examined in decision block 71 to determine if it is encrypted. If so, the NIB buffer is decrypted in function block 72 and a determination is made in decision block 73 as to whether the decryption was successful. If not, a return is made to the WF server API 59 (FIG. 3) in function block 74 to perform a destroy function. If the NIB buffer was not encrypted or the decryption of the code was successful, then a test is made in decision block 75 to determine if there are any interested handlers that should be invoked. If not, a return is made to function block 74, but if so, the NIB buffer is transferred to the appropriate message handler in function block 76 which may potentially modify the NIB buffer. A test is then made in decision block 77 to determine if the NIB buffer should be flushed. If so, a return is made to function block 74, but if not, a further test is made in decision block 78 to determine if the invoked message handler in block 76 successfully processed the NIB buffer. If so, a test is made in decision block 79 to determine if the NIB object state identifier should be modified, and, if so, the process goes to function block 81 to check in the WF server object with the potentially modified NIB buffer and new object state identifier. If the test in decision block 79 indicates that the WF server object state identifier is not to be modified, then a test is made in decision block 80 to determine if there are any more message handlers interested in the NIB buffer. If so, the NIB buffer is passed to the new interested message handler 76. This process is repeated until there are no more interested handlers, at which time a return is made to function block 74. If, in decision block 78, the determination is made that the invoked message handler 76 did not successfully process the NIB, then a test is made in decision block 82 to determine if a retry should be made now and, if so, a return is made to function block 76; otherwise, a further test is made in decision block 83 to determine if a retry is to be made later. If not, a return is made to function block 74; otherwise, the retry handler 52 (FIG. 3) is notified, the retry delay time is set, and the WF server object state identifier is changed in function block 84 before checking in with the WF server API in function block 81. After the retry delay has elapsed, the retry handler 52 (FIG. 3) will check out the WF server object slated for retry and input the object to a map server function 55 (FIG. 3), where the map server function handles the object in the same way as explained above.

The invention is not limited to retail automobile financing applications but may be readily applied to other commercial transaction environments including both unsecured and secured credit applications and financing. Examples of unsecured credit applications include but are not limited to credit card transactions, student loans and lines-of-credit. Secured credit applications and financing include but are not limited to personal property sales and financing, including Uniform Commercial Code filings, of boats, recreational vehicles, motorcycles, and airplanes, real estate sales and home equity loans involving mortgage processing, and loans against any asset such as stocks, bonds, retirement funds and the like.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A financial transaction processing system which provides reliable and secure transmission of information over the Internet comprising:

at least one local computer system which electronically captures information input by a user of the local computer system, the local computer system, in response to a user input or event, generating a request which is handled by an Input/Output (I/O) Application Program Interface (API), running on the local computer system, to generate a data buffer that is forwarded to a message handling client API, also running on the local computer system, which creates a client object containing the data buffer that is forwarded to a store and transport mechanism;

a store and forward transport mechanism receiving and queuing client objects, the store and forward mechanism queuing received client objects for transmission to designated remote receiving servers identified as logical sites;

means for connecting the local computer system to a plurality of computer systems, wherein each computer system stores unique data;

a remote server which contains the location of each of the plurality of computer systems currently active in the system, thereby enabling the transaction processing system to be used as a dynamically configurable wide area network (WAN);

at least one message handling server accessible to the store and forward mechanism via the Internet receiving queued objects from the store and forward mechanism, the store and forward mechanism determining a receiving server as a logical site from data contained in the client object;

a map server function running on the receiving computer system for extracting the data buffer and invoking an appropriate message handler; and a remote computer system, connected to the receiving server, receiving data from the message handler translated into a communications protocol and data format of the remote computer system.

2. The system according to claim 1, further comprising means for encrypting and decrypting the transmitted data buffers.

3. The system according to claim 1, further comprising:
a local legacy computer system; and
means for communicating data to and from the local legacy computer system.

4. The system according to claim 1, further comprising at least one print server process connected to print documents.

5. The system according to claim 4, wherein the print server process is connected locally to the local computer system.

6. The system according to claim 4, wherein the local computer system comprises a Local Area Network (LAN) and the print server process is connected to the LAN.

7. The system according to claim 1, further comprising means for determining locations of remote servers using a remote name server process.

8. The system according to claim 1, further comprising means for receiving code and data updates from a remote software distribution server.

9. The system according to claim 1, further comprising means for recording system transactions using a remote transaction recording server process.

10. The system according to claim 1, further comprising means for receiving updated documents as needed from a remote document server process.

11. The system according to claim 1, further comprising means for receiving new encryption keys and encryption key updates from a remote encryption key server process.

12. The system according to claim 1, further comprising means for transmitting facsimiles to a facsimile machine using a remote facsimile server process.

13. The system according to claim 1, further comprising means for transmitting a request for an information bureau and receiving a response from said information bureau using a remote credit bureau server process.

14. The system according to claim 1, wherein transaction message handling APIs are implemented as a work flow process with client and server parts.

15. A financial transaction processing system implemented as a dynamically reconfigurable Wide Area Network (WAN) to provide reliable and secure transmission of information over the Internet comprising:

at least one local computer system which electronically captures information input by a user of the local computer system, the local computer system, in response to a user input or event, generating a request which is handled by an Input/Output (I/O) Application Program Interface (API), running on the local computer system, to generate a data buffer that is forwarded to a message handling client API, also running on the local computer system;

means for optionally encrypting the data buffer, the message handling client API creating a client object containing the data buffer encrypted or not that is forwarded to a store and transport mechanism;

a store and forward transport mechanism connected to receive client objects, the store and forward mechanism queuing received client objects for transmission to designated remote receiving servers identified as logical sites;

means for determining locations of remote serves using a remote name server process that enables the transaction processing system to be used as a dynamically reconfigurable WAN;

means for connecting the local computer system to a plurality of servers via the Internet to form a dynamic reconfigurable WAN;

at least one message handling server accessible to the store and forward mechanism via the Internet receiving queued objects from the store and forward mechanism, the store and forward mechanism determining a receiving server as a logical site from data contained in the client object;

a map server function running on the receiving computer system for extracting the data buffer and, if the extracted data buffer is encrypted, decrypting the data buffer, said map server function invoking an appropriate message handler; and a remote computer system, connected to the receiving server, receiving data from the message handler translated into a communications protocol and data format of the remote computer system.

* * * * *